United States Patent
Lindley et al.

(10) Patent No.: US 7,200,218 B1
(45) Date of Patent: Apr. 3, 2007

(54) METHOD AND APPARATUS FOR EXTENDING PBX FEATURES VIA THE PUBLIC NETWORK

(75) Inventors: Todd Lindley, Seattle, WA (US); Peggy Stumer, Boca Raton, FL (US); Faramarz Sahim, Boca Raton, FL (US); Joseph Budziak, Boca Raton, FL (US); Henry Wu, Fremont, CA (US)

(73) Assignee: Siemens Corporation, Santa Clara, CA (US)

( * ) Notice: Subject to any disclaimer, the term of this patent is extended or adjusted under 35 U.S.C. 154(b) by 274 days.

(21) Appl. No.: 09/710,037

(22) Filed: Nov. 8, 2000

Related U.S. Application Data

(60) Provisional application No. 60/164,428, filed on Nov. 9, 1999.

(51) Int. Cl.
*H04M 7/00* (2006.01)

(52) U.S. Cl. .............................. 379/221.11; 379/221.1; 379/221.09; 379/221.08

(58) Field of Classification Search ................ 379/419, 379/198
See application file for complete search history.

(56) References Cited

U.S. PATENT DOCUMENTS

| 3,867,582 | A |   | 2/1975  | Weed et al. ................. 379/198 |
| 4,631,534 | A | * | 12/1986 | Franklin et al. ......... 340/825.5 |
| 5,764,639 | A |   | 6/1998  | Staples et al. .............. 370/401 |
| 5,870,465 | A |   | 2/1999  | Hosbach et al. ............ 379/419 |
| 5,905,776 | A |   | 5/1999  | Shaffer ..................... 379/88.22 |
| 5,991,390 | A | * | 11/1999 | Booton ................... 379/265.02 |
| 6,359,892 | B1 | * | 3/2002  | Szlam ........................ 370/401 |
| 6,587,546 | B2 | * | 7/2003  | Stumer et al. ................ 379/37 |
| 6,678,356 | B2 | * | 1/2004  | Stumer et al. ................ 379/37 |

FOREIGN PATENT DOCUMENTS

EP   0 952 742   10/1999

* cited by examiner

*Primary Examiner*—Wing Chan
*Assistant Examiner*—Karen Le

(57) ABSTRACT

A system and method allow PBX features to be extended through the public network. A teleworker calls into a PBX system and is assigned a fictitious port. The fictitious port is controlled by a telework server and appears to the PBX to be a local device. PBX features are invoked by particular sequences of DTMF tones or by voice prompt, or another data input system.

26 Claims, 10 Drawing Sheets

METHOD AND APPARATUS FOR EXTENDING PBX FEATURES VIA THE PUBLIC NETWORK

PRIOR PROVISIONAL APPLICATION

This application relates to and claims priority from pending provisional application No. 60/164,428, filed Nov. 9, 1999.

FIELD OF THE INVENTION

This invention relates to telecommunications systems, especially PBX systems.

BACKGROUND OF THE INVENTION

People can access a wide variety of services and functions through telecommunications systems. A subscriber can receive, send, and forward voice messages, faxes, e-mail, and data, and can remotely manage many business and personal functions.

This new technology has important implications for teleworking. In teleworking, a teleworker performs work functions from a remote location. In many cases, a teleworker can perform functions identical to those performed by her colleague in the office. Teleworking can be loosely defined as workers performing work functions remotely through a telecommunications system.

Teleworking offers workers unprecedented flexibility and convenience for workers. It also provides opportunities for people who have traditionally been excluded from the work force or who have been able to participate on a limited basis only. It can remove geographical barriers, better integrate women and the disabled into the work force, and provide retraining and rehabilitation programs for the institutionalized.

Most advanced features are implemented and controlled through a control channel, which requires the user to have a telephone system, typically ISDN, that provides a separate channel for the control signal. Unfortunately, many subscribers do not have ISDN telephones or ISDN lines. ISDN telephones and lines are particularly rare in private homes, locations where teleworking can make the biggest difference. What is needed is a better way to integrate ordinary subscribers into teleworking.

SUMMARY OF THE INVENTION

A system and method are provided for allowing clients with a variety of teleworking devices, including digital and/or nonspecialized dual-tone multi frequency (DTMF) telephones, to invoke PBX (private branch exchange) features. The user can invoke all or, alternatively, major PBX functions from any location.

In a preferred embodiment, a mobility circuit board system (IGate, SMPLX, WAML) includes a set of ports, called fictitious ports, that are not dedicated to fixed branch extensions. A fictitious port on a mobility board is assigned to a teleworker. The circuit board is responsible for enabling a teleworker at a remote phone to be treated by the switch as if he were connected to a standard physical port of the switch. When a teleworker logs in, he is assigned a fictitious port, which supports access to PBX functions.

After logging in, the teleworker can input DTMF tones to access PBX features. The DTMF tones are sent to the teleworking server (TW server, TWS). If a feature code is recognized by the server, the DTMF tones are suppressed from reaching the other party, and the teleworking server invokes the requested feature and sends the proper signals to the switch. The system thus provides the teleworker PBX functions at any location. In alternatives, an interactive voice recognition (IVR) system with prompts can be used to signal selection of PBX features.

Among other features, the system and method also provide for identification and call-back to avoid toll charges; activation and deactivation of call redirection; entering new call redirection destinations; identification of call redirection phone numbers; receiving and making both business and personal calls; activation and deactivation of voicemail and fax mail notifications; locating the teleworker; and dialing into specific numbers that activate and/or deactivate teleworking features without requiring user input and without requiring the call to be answered. Many of the features of the invention are described in "ID 0210—Mobile Teleworking, Status: Released FDB 2;" "F10210_c:FDB 1, Version 1.3," author J. Budziak/A. Wild; and Hicom 300E CS, Version 6.5, Description Manual," all of which are incorporated herein by reference in their entirety.

DESCRIPTION OF THE PREFERRED EMBODIMENTS

Figure 1:
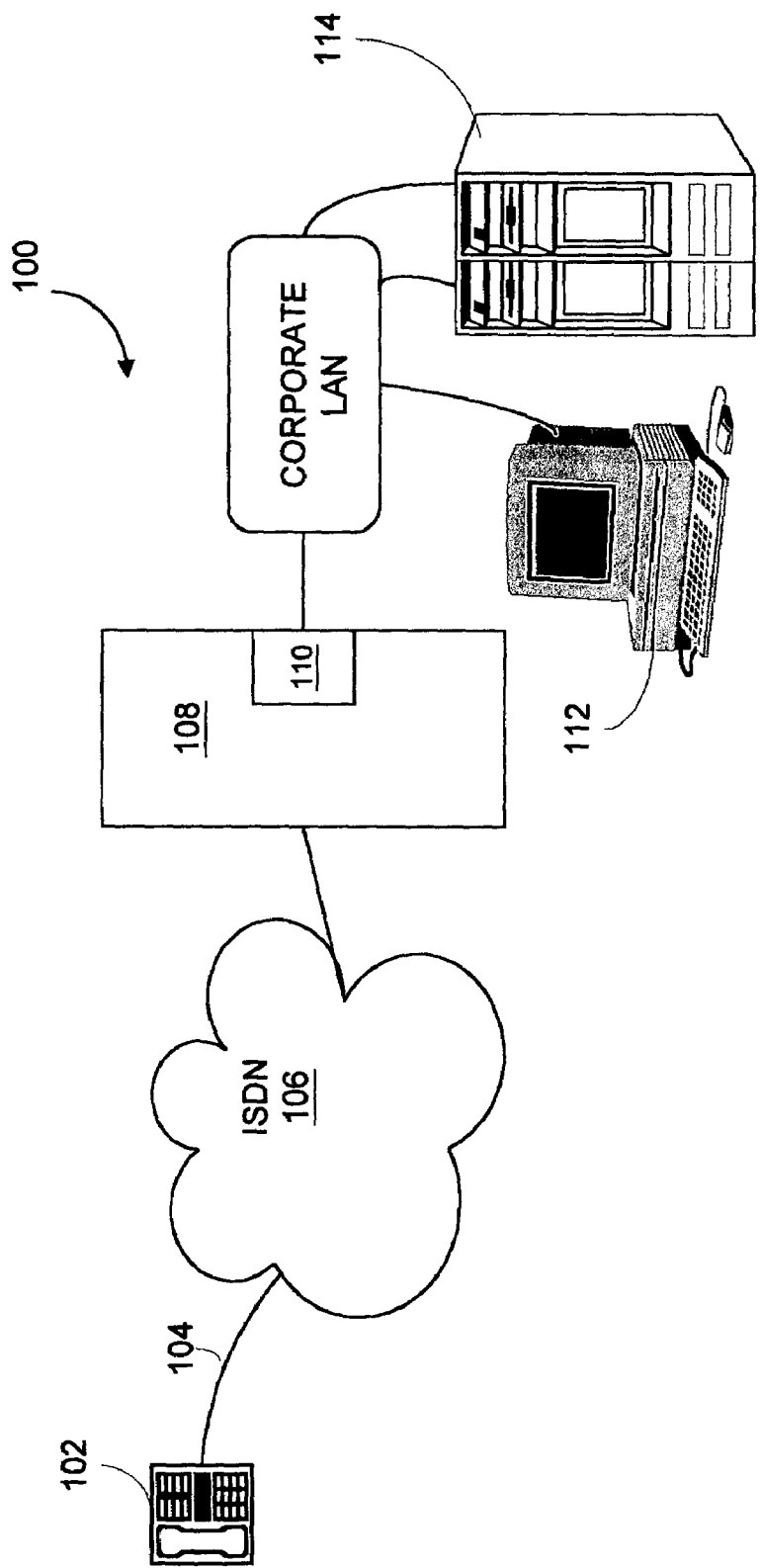
FIG. 1 is a depiction of a system with digital telephones.

A system 100 using digital telephones is illustrated in FIG. 1. An ISDN telephone 102 is connected by an ISDN line 104 to ISDN network 106. ISDN network 106 is connected to switch 108, which can be, for example, a PBX. Switch 108 includes a circuit board 110, such as a subscriber line module port extender (SLMPX) board, IGate, or WAML. A computer system 112 is connected to switch 108, including a telework server 114. Telework server 114 controls board 110, enabling switch 108 to treat telephone 102 as though it were local.

Using system 100, a teleworker with an ISDN phone 102 and access to an ISDN line 104 can call the office from a remote location. The number dialed is recognized by switch 108. The user is typically required to input a PIN (personal identification number) to access the services. (The PIN can be used alone or in conjunction with a password or other security features as described below.) When the PIN is recognized, the user can access all the features that an in-house user can access via the PBX. Remote ISDN telephone 102 can function as an extension of the PBX.

Figure 2:
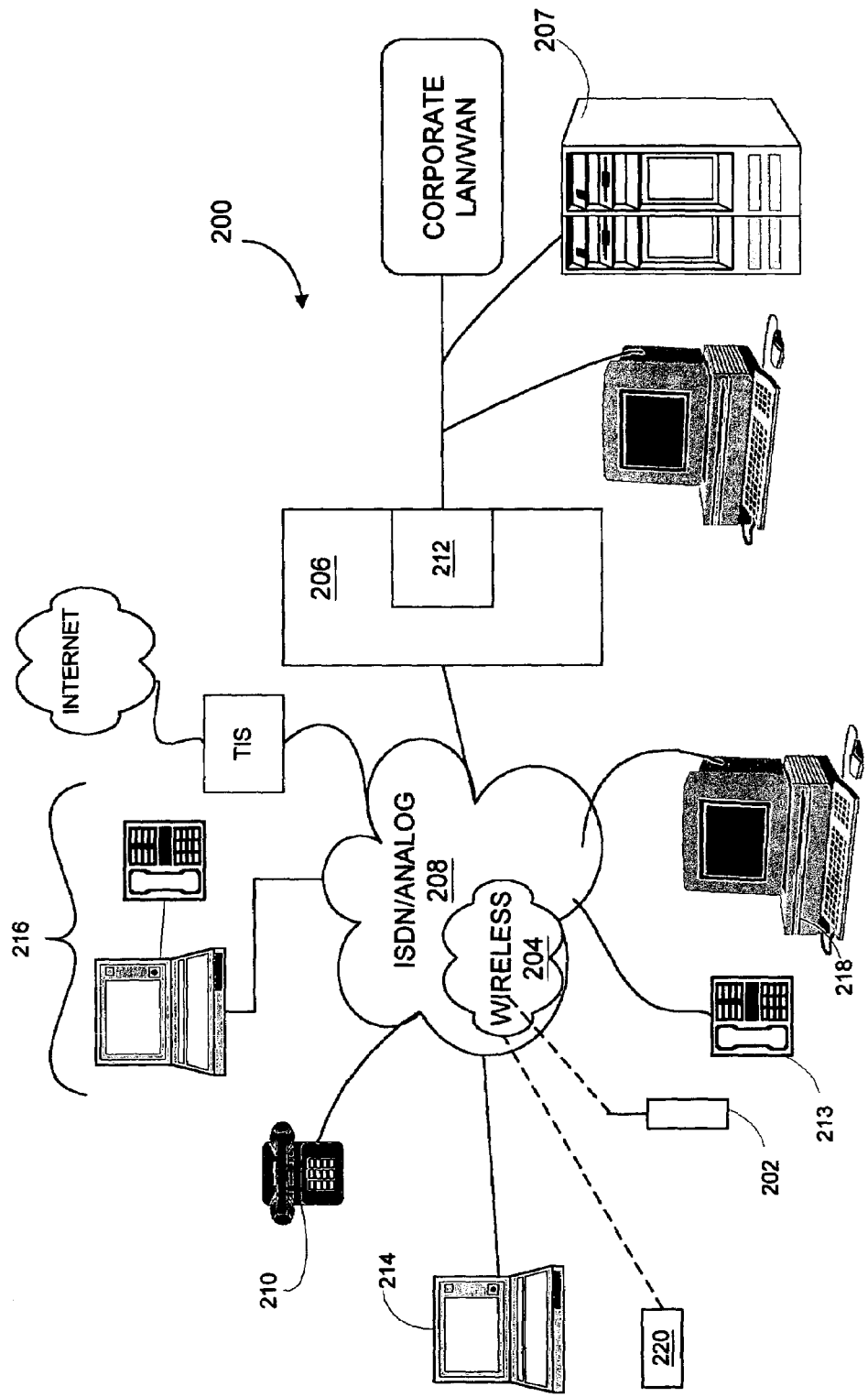
FIG. 2 is an illustration of a system allowing feature control by in-band DTMF signaling and/or voice command.

A system 200 in accordance with the present invention is depicted in FIG. 2. A wireless telephone 202 connects through the wireless network 204 to PBX switch 206.

In a preferred embodiment, a teleworker calls into the system via telephone 202 and enters a personal identification number (PIN) by entering a sequence of keystrokes. Switch 206 detects the DTMF tones and transmits the digits to a telework server 207. In a preferred embodiment, the tones are sent via protocol (in a preferred embodiment, port extender protocol PXP).

Telework server 207 checks the input code against a table stored in memory. Upon recognition of the PIN, access to the system is granted. In another alternative, the calling telephone number is captured by caller ID or identified by calling party number, and if recognized by comparison with a list of numbers stored in memory, access is granted. This step can be followed by entering an office extension identifier, a PIN, a password, and/or a token authenticator. As those with skill in the art will be aware, the security steps can be performed in any combination or logical order. Alternatively, other identifiers as known in the art, such as voice recognition, can be used. After the teleworker is approved, login is complete. In an alternative login, the system can call back a teleworker upon recognition of the calling number, without answering the call, or after answering upon entry of the PIN, thus eliminating or decreasing the teleworker's toll charges.

After login, the teleworker is allocated a fictitious port. A fictitious port is an unassigned port local to the switch that is assigned to the teleworker for the call and through which PBX features can be accessed. In a preferred embodiment, the port is an EDSS1/NI2 BRI remote port including two B-channels.

A circuit board 212 (such as IGate) of switch 206 enables a teleworker at wireless phone 202 to be treated by the switch as if he were connected to a standard physical port of the switch. The circuit board can set up fictitious ports with an ISDN telephone 213 and can function as described in FIG. 1, and can handle other devices, including computers, wireless, hybrid, and analog, as further illustrated in FIG. 2.

During a call, the teleworker enters a DTMF feature request prefix code (for example, ##); the feature request prefix is followed by an assigned access code for the particular feature invoked. Typically, the teleworker enters the DTMF code by dialing (depressing keys) from wireless telephone 202 or a telephone 210. Other devices, such as a laptop 214, a hybrid voice-data device 216, a computer 218 can be used to enter the DTMF tones; a DTMF tone generator 220 can also be used. These devices can get access to the PBX through interconnected networks, such as the wireless network and the Internet. A telephony Internet server (TIS) and/or plural telephony Internet servers can allow connectivity through Intranet as well as Internet.

Alternatively, the feature can be invoked by a sequence of keyboard or keypad strokes or other signaling method. The feature can be invoked as a single string indicating PBX-feature request and the feature requested, or can be broken into steps, e.g., first requesting PBX features by DTMF and then following prompts or IVR to request specific features.

A telework server 207 controls the board as more fully described in the method and system descriptions below. If the teleworker is using a voice-only device, only one B-channel is used. If the teleworker is using an ISDN device 213 or another digital device such as an Optiset E device, the two B-channels can be used, or another combination of B-channels and D-channels. One B-channel is used for switch commands and one for voice. Alternatively, when using a hybrid device such as device 216, voice and data can alternate on a single analog line.

Figure 2A:
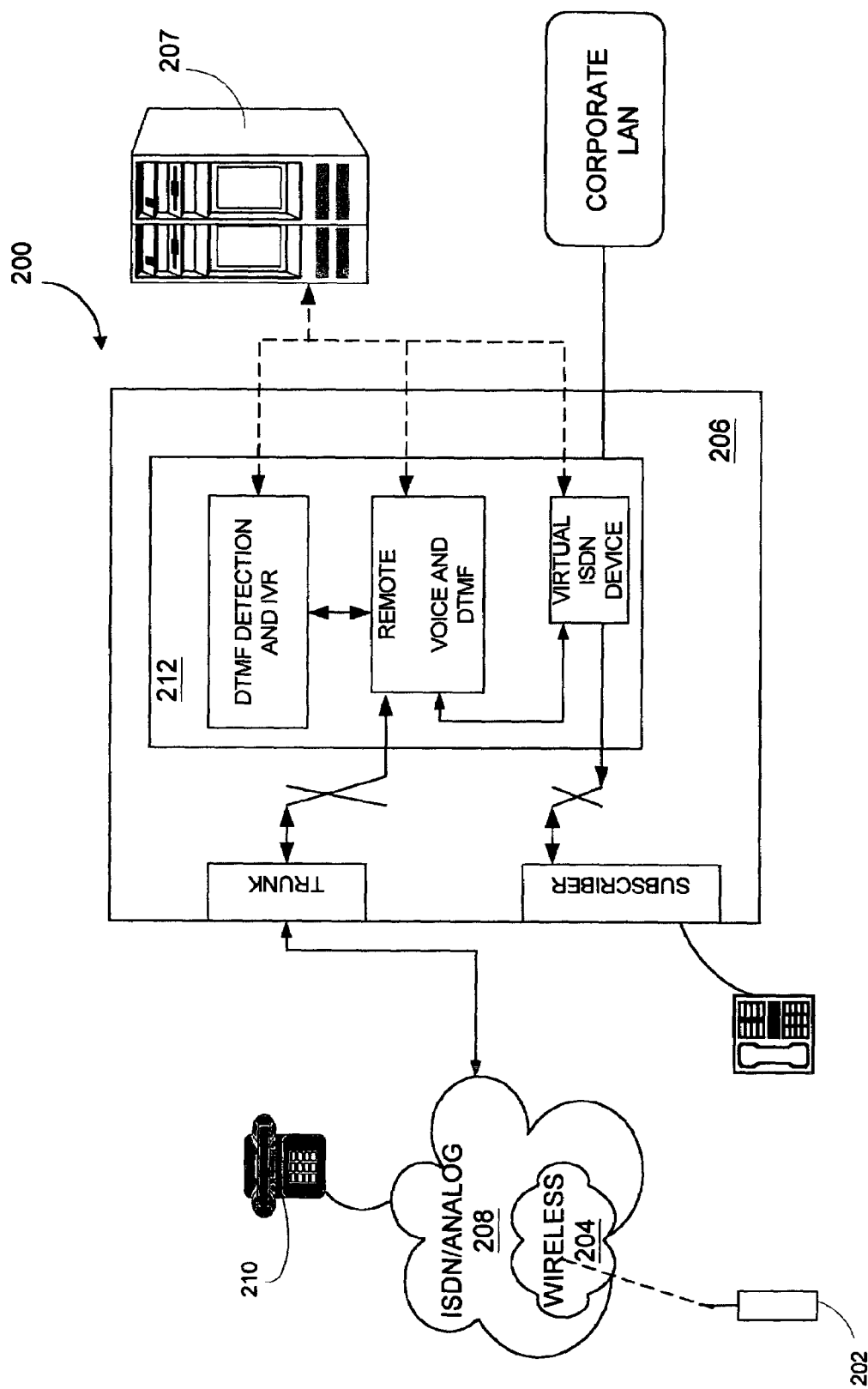
FIG. 2A shows a switch and board in greater detail.

FIG. 2A illustrates the system in greater detail. Dashed lines indicate protocol signal control and communication. Solid-line pathways represent communication paths.

The system can be used with other systems. For example, in a Global Systems for Mobile Communications (GSM) system, a telework user interface (TUI) can provide menu options such as feature access via SIM card ("smart card"). The TUI presents feature options which when selected will generate the appropriate DTMF tones (feature request prefix+feature code).

Figure 3:
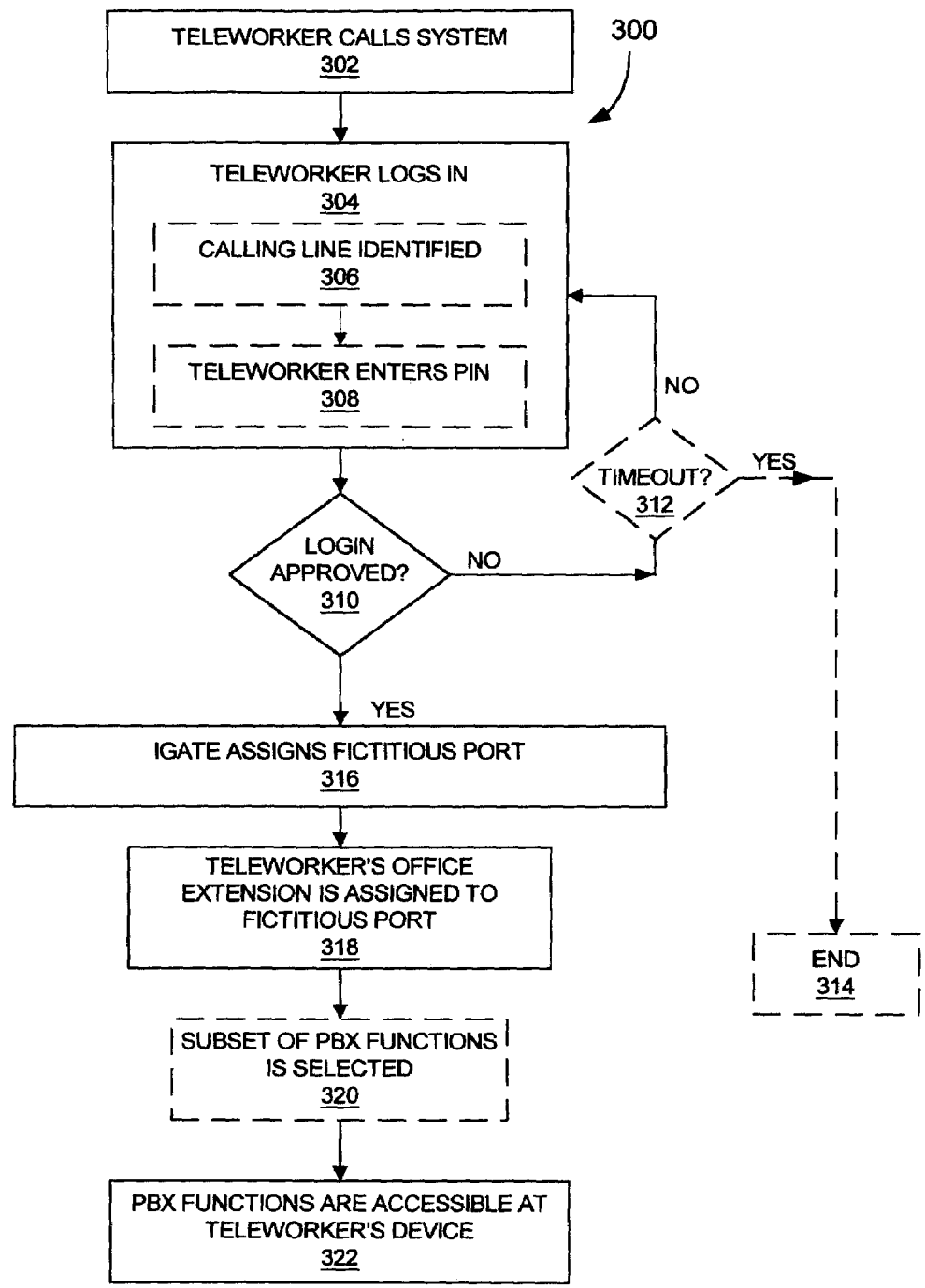
FIG. 3 is a flow chart showing the steps of a method of logging on to the system of FIG. 2.

A method 300 for logging in is illustrated in FIG. 3. At step 302, the teleworker calls the system. (In alternatives, the system places a call to the teleworker.) At step 304, the teleworker logs in, including an optional substep 306, at which the calling line is identified, and an optional substep 308, at which the teleworker enters a PIN. Neither step, either step, or both steps can be implemented as part of login. Furthermore, other identifiers such as voice recognition can be added or used as alternatives.

At step 310, the TWS checks the login. If the login is not approved, the method loops back to step 304. As indicated by optional step 312, the number of attempts can be regulated by an attempt counter or a timeout timer. If the process times out, the method ends, at a step 314.

If the login is approved, the method continues to step 316, and the IGate assigns a fictitious port to the user. At a step 318, the TW server assigns the teleworker's office extension to the fictitious port. An optional step 320 makes a subset of PBX features available to the fictitious port; alternatively, the full set of features is available. At a step 322, the PBX features can be accessed at the teleworker's remote site, the site from which the original call was placed.

Figure 4:
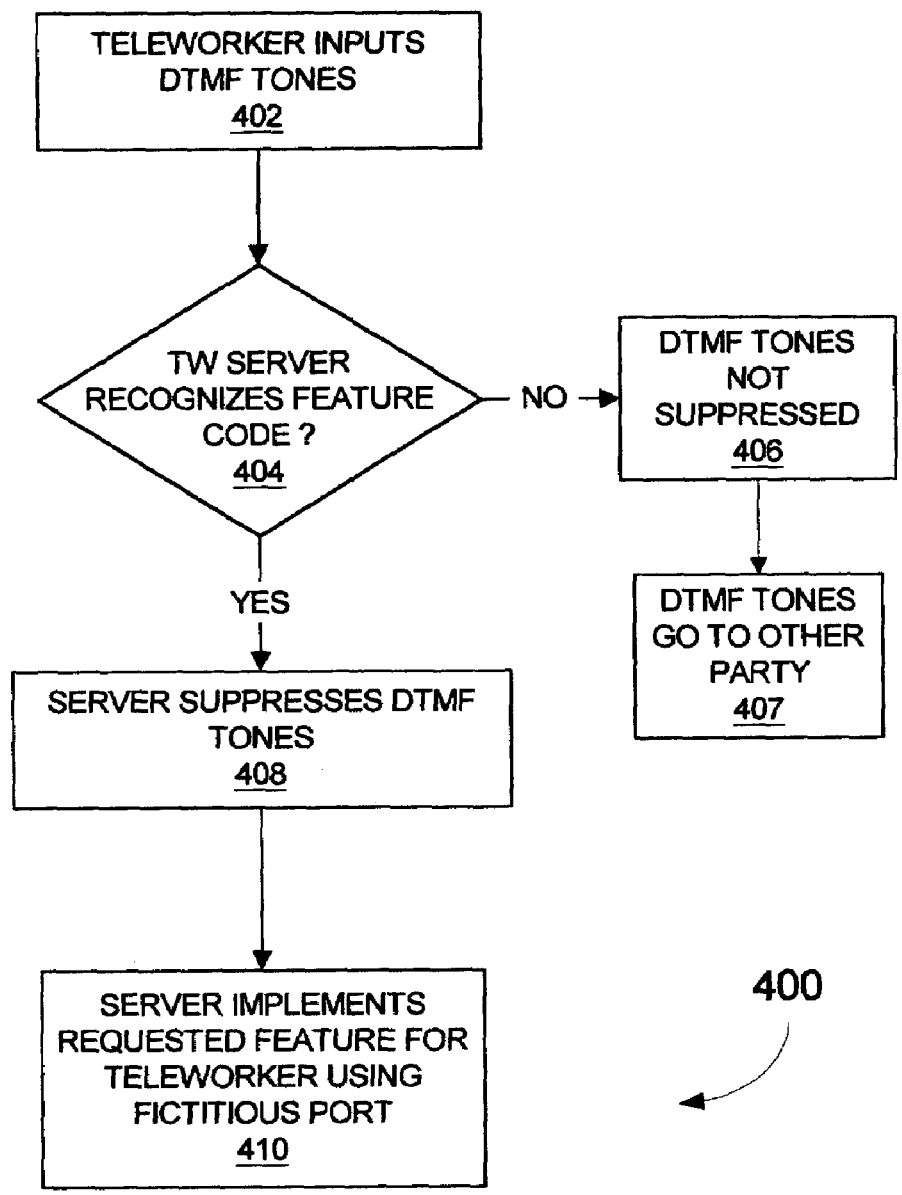
FIG. 4 is a flow chart showing the steps of a method of accessing PBX features from a non-PBX telephone.

A method 400 of handling DTMF tones is depicted in FIG. 4. At a step 402, a teleworker inputs DTMF tones. At a step 404, the telework server checks whether the DTMF tones represent a stored feature code. If not, the tones are passed through to the switch at a step 406.

If the server recognizes a feature code, the server suppresses the DTMF tones, at a step 408. At a step 410, the server instructs the switch to implement the requested feature using a fictitious port.

Figure 5:
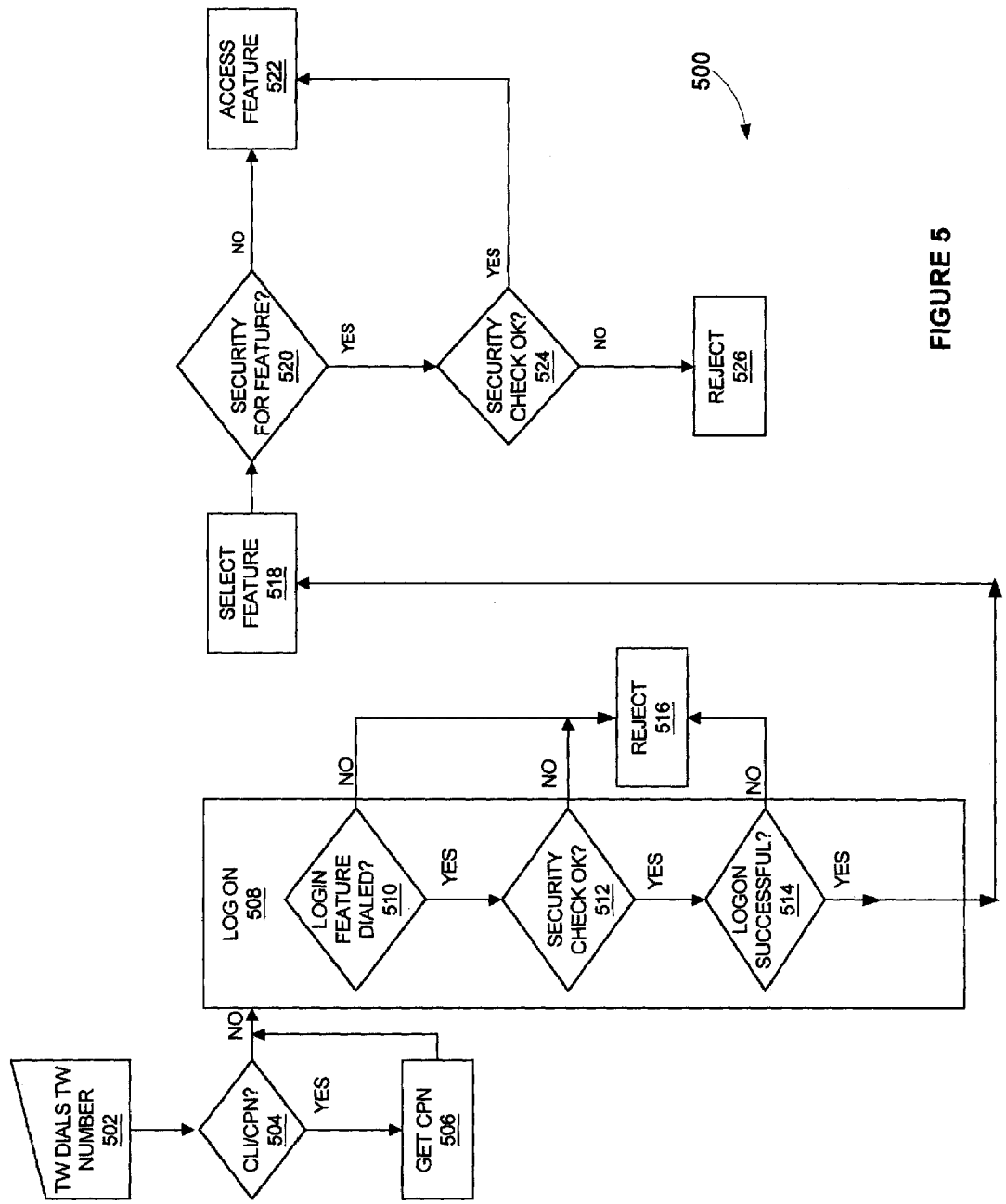
FIG. 5 is a flow chart showing the steps of a method of accessing PBX features from a non-PBX telephone including security features.

A method 500 using security features is shown at FIG. 5. A teleworker dials the teleworker access number, at step 502. At step 504, the system checks whether a calling line identifier (CLI) or calling party number (CPN) is captured. If yes, the system retrieves the calling party number at a step 506.

The method then proceeds to login step 508 and its substeps 510–514. If the answer to any of substeps 510–514 is no, the login is unsuccessful and the call is rejected, at step 516.

At substep 510, the system checks whether the login feature has been dialed. If yes, the system proceeds to substep 512 and determines whether the security check has been approved. If yes, the system proceeds to substep 514 to determine whether the login is successful. If yes, the method proceeds to step 518, and the user selects a PBX feature. This is the beginning of the user's teleworking session.

The method then proceeds to step 520, where the server checks whether the selected feature has a security requirement. If not, the feature is accessed, at step 522.

If the selected feature has a security requirement, the method checks, at step 524, whether the security requirement has been met. The security requirement can be a class-of-service limitation stored in a table; a PIN or other code entered by the teleworker; an authorization entered elsewhere in the system, as for example, a manager's approval; a captured identifier, such as calling line identification; or other security measures as known to those skilled in the art.

If the security requirement has not been met, the method proceeds to step 526 and the feature is rejected. If the requirement has been met, the feature is accessed, at step 522.

Figure 6:
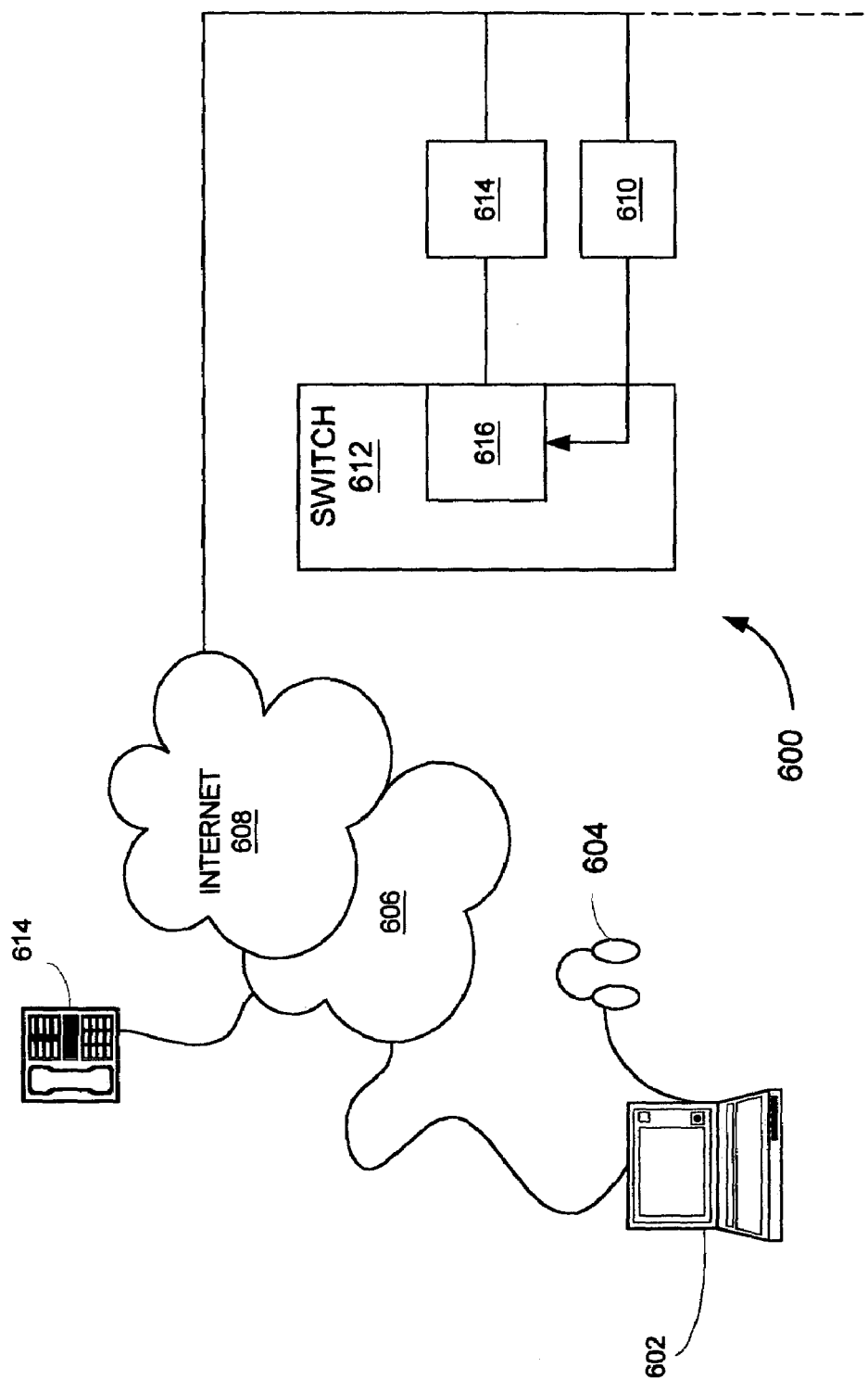
FIG. 6 is a depiction of a system using inband signaling and connecting through the Internet.

FIG. 6 depicts a system 600 that connects over the Internet. A laptop computer 602 including a headset 604 connects through telephone networks 606 to the Internet 608. In alternatives, the computer can be a personal computer (PC), personal digital assistant (PDA), or other computer; the headset can be a handset or a standard telephone. A telephony Internet server (TIS) 610 connects a switch 612 to the Internet 608 so that the switch can make outgoing contact through the Internet. Switch 612 is also connected to a telework server 614. An incoming call from a teleworker would proceed as follows.

A teleworker calls in via laptop 602. The call is routed through networks 606, which can include an ISDN network and the public switched telephone network (PSTN). The call is then routed to Internet 608, and then to telephony Internet server 610. Computer 602 includes a DTMF generator which generates tones that are sent to telework server 614, which instructs the switch to implement the desired functions.

Figure 7:
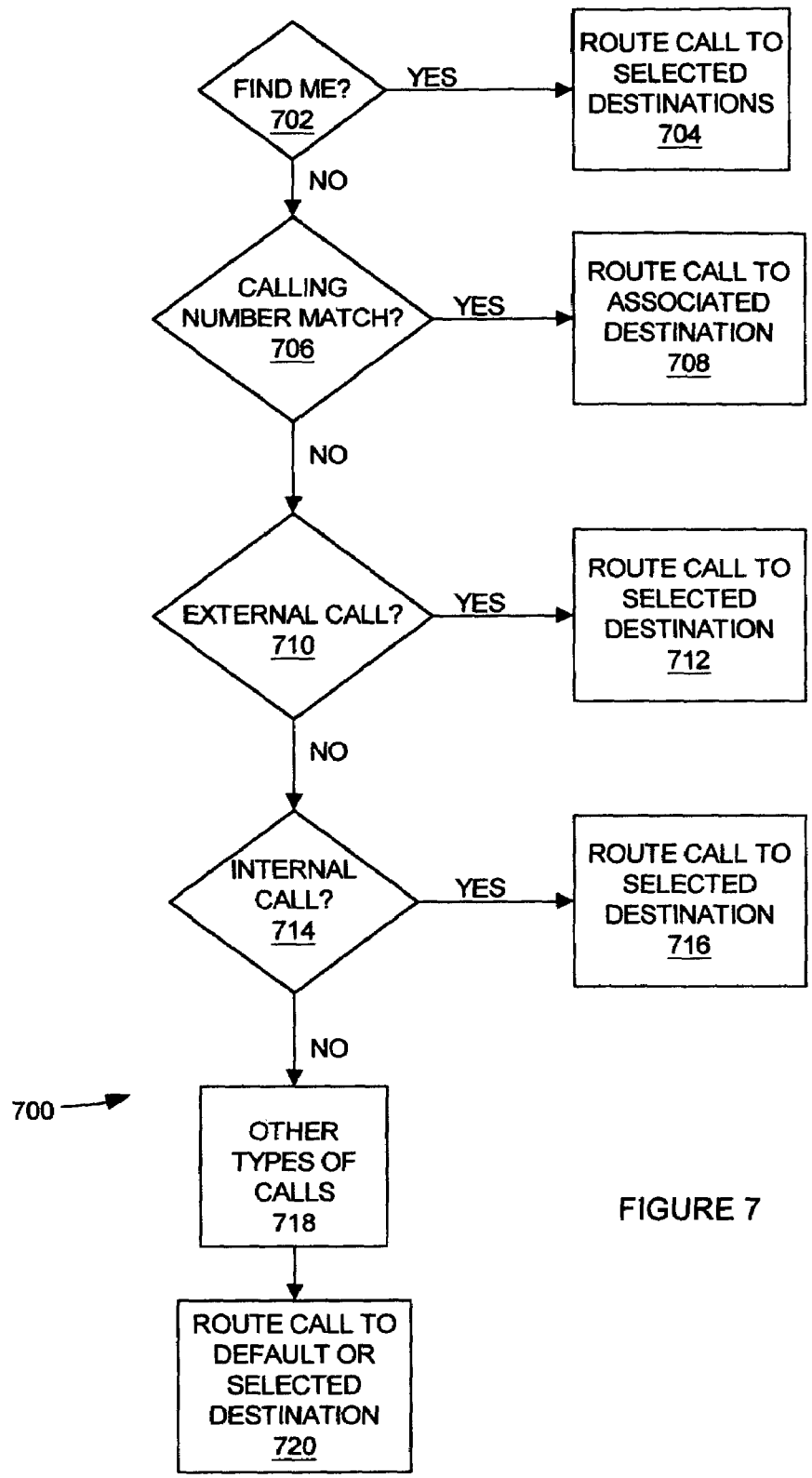
FIG. 7 is a depiction of a teleworker server call routing procedure.

An incoming call routing procedure in accordance with the present invention is illustrated in FIG. 7. The system first checks whether "find me" procedures are selected, at a step 702. "Find me" procedures locate a teleworker who moves between locations. In "find me," a list of telephone numbers are stored in the server. The numbers can be part of the teleworker's profile or can be input dynamically upon starting a telework session. When a call comes in for a teleworker and "find me" is activated, a plurality of fictitious ports ring at the designated locations virtually simultaneously.

If "find me" is activated, the method routes calls to the designated numbers, at a step 704. If not, the method then checks whether the call should be forwarded to a particular number, at a step 706. If not, it checks whether the call is external, at step 710. If the call is not external the method checks whether the call is internal, at step 714. If any of these checks is satisfied, the associated routing preference is activated, and the system routes the call accordingly (steps 708, 712, or 716). If none of the checks is satisfied, at a step 718, the call is routed to a default destination, shown at step 720.

Figure 8:
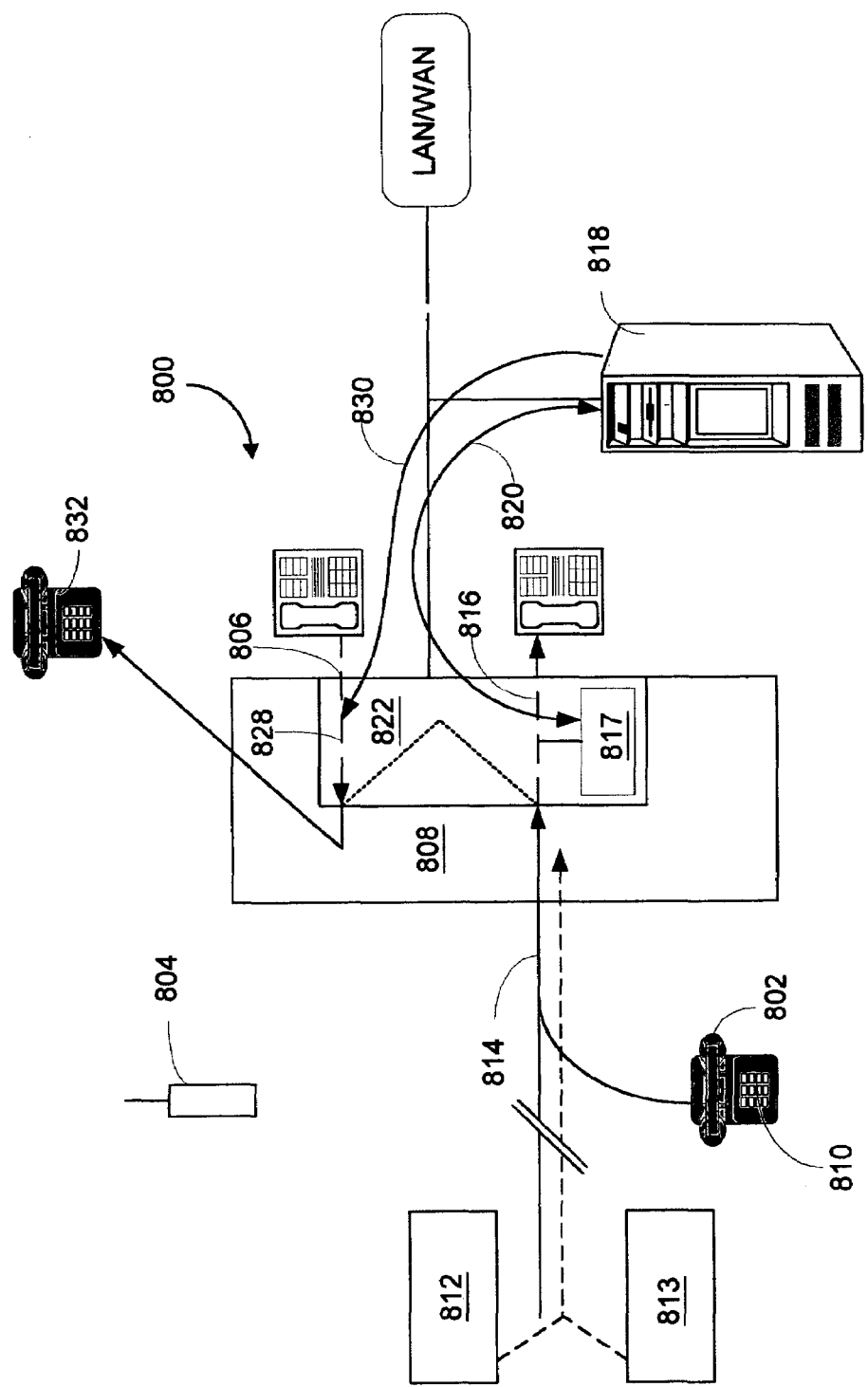
FIG. 8 is a diagram illustrating PBX feature control via DTMF.

Specific examples of feature control via DTMF in a system 800 are illustrated at FIG. 8. Using a landline telephone 802 or a wireless telephone 804, a teleworker dials a teleworker access number and is assigned an EDSS1/NI2 fictitious port 806 of a switch 808 of system 800.

In this example, the teleworker will place a call with external telephone 832. Using DTMF tones, a teleworker inputs an access code (for example, ## is a preferred feature request prefix), followed by a feature code chosen from a set of feature codes (for example, 4* (hold), 5* (forward), 6* (callback), and 9* (conference)). The DTMF tones can be entered by pressing keys of keypad 810 of landline telephone 802, using keys on wireless telephone 804, or alternatively using a pocket DTMF sender 813. The teleworker can receive information or prompts of feature codes by an interactive voice recognition system (IVR) via telephone 802, telephone 804, or by a telework user interface (TUI) display menu 812. Display menus can also be used with other telephone devices, as is known to those skilled in the art. TUI 812 presents feature options which when selected will generate the appropriate DTMF tones (feature request prefix+feature code), and can be used in conjunction with a SIM card of wireless telephone 804 in a GSM system.

The DTMF tones are transmitted to DTMF filter 817 in switch 808, schematically illustrated by a pathway 814. The DTMF filter recognizes the DTMF tones and sends the sequence of tones via a protocol (schematically represented by bidirectional arrow 820) to a telework server 818 of system 800. In the preferred embodiment, the protocol is a Port Extender Protocol (PXP).

A remote port 816 can be used in conjunction with the fictitious port to effect a callback from the switch to the teleworker so that the teleworker can avoid long-distance charges.

Telework server 818 analyzes the dialed digits (the DTMF sequence) received by the switch. In a preferred embodiment the telework server consults a DTMF code translation table. If the sequence of DTMF tones is not found in the table, the server sends the tones to the switch via protocol (schematically illustrated by bidirectional arrow 820). In one embodiment, the switch suppresses the tones; in alternatives, the tones are not suppressed and are received by other parties to the call.

If the DTMF sequence is found in the consulted table, server 818 instructs the fictitious port via protocol (schematically illustrated by arrow 830) to invoke the feature coded for. The instructions are passed through a mobility board 822 to switch 808. The communication path from the fictitious port through the mobility board 822 is schematically illustrated by dashed line 828.

In one embodiment, the fictitious port is assigned a class of service that is determined by the number dialed, an input code, or a captured identifier such as caller ID. In such a case, the switch 818 can check the class of service of the fictitious port and implement features according to the class of service associated with it.

The call and invoked features are implemented by the switch, as schematically illustrated by arrow 830, and can be used in the teleworker's call to any internal or external phone 832.

The system can be applied during a call in progress. For example, consider a call in progress between a teleworker at telephone 802 and external telephone 832. If the teleworker inputs access and feature codes, the features will be invoked as described supra.

Now consider a call in progress between a teleworker at telephone 802 or, alternatively, wireless telephone 804, and external telephone 832; assume that a "phone tree" at external telephone 832 will require input DTMF tones from telephone 802. The teleworker inputs the DTMF tones for the phone tree selections. They are suppressed by filter 817 and the digits they represent are sent by PXP to server 818. In alternatives, the DTMF tones are not suppressed (e.g., they reach telephone 832 and can be analyzed by the server simultaneously).

Server 818 consults a look-up table; in this example, the DTMF sequence does not appear in the table. The sequence is not interpreted by the server as requesting a feature from the switch. Via protocol, the server instructs the switch to send the input DTMF tones to telephone 832, allowing the teleworker to make telephone tree selections.

Figure 9:
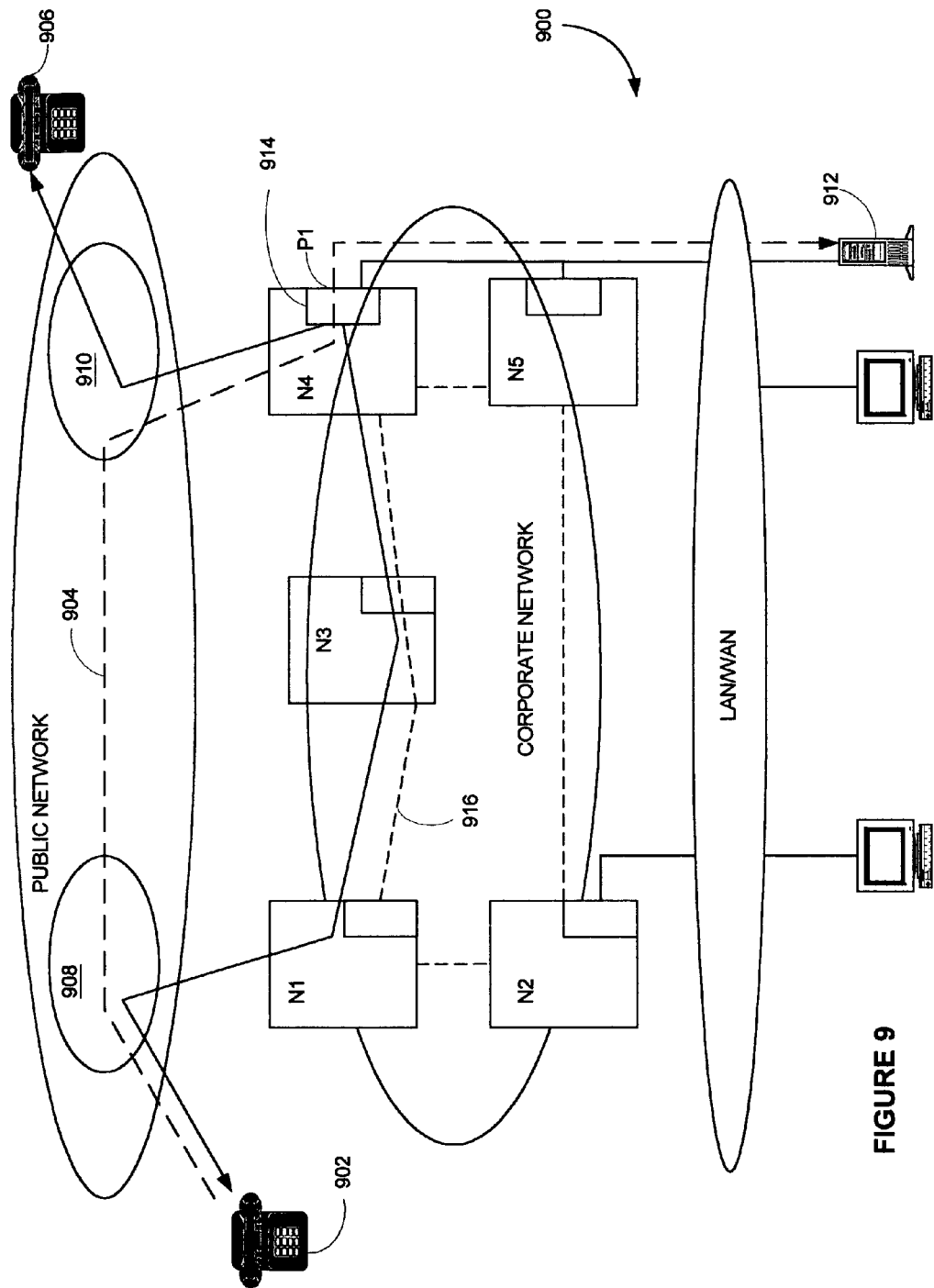
FIG. 9 schematically depicts connection through nodes of a corporate network.

The invention also provides for a system 900 to allow a teleworker to establish a call at a node in the corporate network near the teleworker and connect via other nodes in the corporate network, as illustrated in FIG. 9. This can increase throughput by bypassing busy pathways and can reduce long-distance charges. The system shown in FIG. 9 allows a teleworker to establish calls via the nearest node in one of two ways: connection request via local node and the switch establishes the call via least-cost routing, or an Optiset teleworker can call the local access code of the corporate network. After logging in, a teleworker 902 requests a connection (schematically depicted by dotted line 904) to a remote telephone 906 by dialing the number for telephone 906 along with DTMF tones representing feature request prefix and feature sequences. The DTMF-tone request 904 is passed through a node 908 near the teleworker to a remote connection 910, and then through a node N4 in the corporate network to a teleworker server (TWS) 912. The DTMF tones are recognized as a feature request prefix (FRP) and feature sequence. In alternatives, for example with ISDN devices, the features are requested without using DTMF tones.

TWS 912 establishes a fictitious port P1 in mobility board 914 in node N4 and routes the call between teleworker phone 902 and remote phone 906 through nodes N1, N3, and N4. Alternative pathways can be established through fictitious ports in any of the mobility boards in any of nodes N1–N5 and the LAN/WAN, as schematically shown by a dashed line 916.

The teleworker is able to receive private calls at the phone via the public network. The caller calls the teleworker's office number and the telework server uses a remote port to make an outgoing call to the teleworker's device. Alternatively, a person can call the teleworker at his private home telephone (the telephone being used as the telework device). The call can be forwarded to the office number through call forwarding, or can get through to the device if it is idle.

In one embodiment that may be useful in systems such as those in use in Europe, fixed-key or button features (as for example the 19 key features commonly available in Europe) can be dialed by DTMF tones by mobile users via a predetermined feature access code plus the assigned code for the particular feature invoked. The DTMF tones are sent to the IGate, which then sends them to the server. The server matches the digit string to the corresponding feature listed in a table. The message is then sent via protocol to control PBX features.

Remote access server clients can access the corporate LAN via ISDN dial-in connections using the point-to-point protocol (PPP) with high-level data control (HDLC). Any supported application can exchange information over the established PPP link. WAML cards can also be used for remote connections. User licenses can be checked by dongle.

Other embodiments are contemplated by the system and method. Access to particular features may be permitted or denied by the user's class of service, by hierarchical or coded PIN numbers and/or password, by captured identification information, by system definition (e.g., certain numbers or certain geographical locations may have access to different features than others), or by combinations of these.

Particular features that can be accessed include message notification features, such as playing back recorded voice-mail messages, and receiving notification by signal, message, or text, that a message is waiting. Signal notification can include lights, stutter tones, and/or paging. The teleworker accesses his voice mail account as usual and sends instructions by voice prompt or by DTMF sequences.

Message notification can be used in conjunction with "find me" techniques described above. Message notification can include simple notification that a message is waiting, or can include information such as that the message is urgent or that a call back is requested.

The system also provides for fax and e-mail message notification. Text-to-voice conversion can be used to deliver written messages to the teleworker. In addition, standard PBX features such as message forwarding, skipping messages, etc., can be implemented using this system.

The system provides for locating a teleworker who moves between locations. This can be implemented by a "call forwarding" technique, as is known in the art, or by table lookup (e.g., the teleworker may be at a first number during certain hours and a second number at other times; or the system can try a hierarchical list beginning with the location she is likeliest to be and then trying less likely phone numbers). The system can also be configured to locate the teleworker by pager or e-mail. Alternatively, the call can ring simultaneously at a number of telephones. Simultaneous ringing can also be used where calls are directed to a group rather than individuals. For example, an incoming customer service call can ring at plural customer service extensions and/or remote teleworking devices, to be answered by the first available agent.

Logoff may be completed by manual logoff, as by the teleworker going on-hook or entering a sequence of keystrokes. Alternatively, the system can automatically log off a teleworker by time, by function (e.g., by completion of a call or certain number of calls). In other alternatives, automatic scheduled logoff time can be configured on the TW server.

For all purposes of this application "private branch exchange" and "PBX" include "private automatic branch exchange" and "PABX".

Those skilled in the art will be aware of numerous variations within the spirit of the invention, the scope of which is limited only by the following claims.

What is claimed is:

1. A method of teleworking in association with a PBX system and allowing each of a plurality of teleworking users to access features of a PBX switch associated with the PBX system, through a public network, the method comprising the steps of:

teleworker devices connecting to the PBX switch of the PBX system, said PBX system including a plurality of standard PBX ports, each identifiable to one or more teleworking users;

the PBX switch assigning a fictitious port to each connecting teleworker device to directly connect the teleworker device to the PBX, wherein the PBX treats devices assigned to fictitious ports as being connected to a standard PBX port, said fictitious port being assigned based on matching a predetermined class of service for said fictitious port and an identified teleworking user for said teleworker device;

after call connection, receiving selection of at least one of the available PBX switch features; and a telework server associated with said PBX system instructing the PBX switch to implement the selected feature.

2. The method of claim 1 wherein the teleworking user connects to the PBX system by the teleworking user initiating the call to the PBX system.

3. The method of claim 1 wherein the teleworking user connects to the PBX system by the PBX system initiating the call to the teleworking user.

4. The method of claim 1 wherein the teleworking user selects one or more PBX features by inputting a series of dual tone multifrequency (DTMF) tones.

5. The method of claim 4 further comprising the steps of:
the telework server determining whether a sequence of input DTMF tones corresponds to one of the available PBX features; and
the telework server instructing the PBX switch to implement the feature.

6. The method of claim 5 wherein the system suppresses said sequence of DTMF tones if said sequence corresponds to a feature implemented by the PBX switch.

7. The method of claim 5 wherein the system passes through said switch said sequence of DTMF tones if said sequence does not correspond to a feature implemented by the PBX switch.

8. The method of claim 4 wherein PBX features are selected while a call is in progress.

9. The method of claim 1 wherein the teleworking user is identified before being assigned a port.

10. The method of claim 9 wherein the teleworking user is identified by an input password.

11. The method of claim 9 wherein the connected teleworker devices are identified by a calling line identifier.

12. The method of claim 1 wherein ones of said connected teleworker devices are an ISDN device.

13. The method of claim 1 wherein ones of said connected teleworker devices are a digital interface.

14. The method of claim 1 wherein ones of said connected teleworker devices are is an IP telephonic device.

15. A system that allows each of a plurality of teleworking users via a corresponding telephony device to implement selected telephony features of a private branch exchange (PBX) through a public network, comprising:
a switching network including a plurality of standard physical port and that interconnects with each said corresponding telephony device, implements system and station telephony features, and handles call communications channel switching;
an interface to the switching network, said interface including at least one fictitious port temporarily assignable to said telephony device, directly connecting the switching network to the telephony device, said each corresponding telephony device assigned to a corresponding fictitious port being treated by said switching network as connected to a standard physical port; and
a telework server in communication with said switching network, said telework server receiving instructions from said each corresponding telephony device after call connection to implement at least one telephony feature selected from a set of telephony features available at said switching network through said each corresponding telephony device, said telework server instructing said switching network to implement said selected telephony features and assigning the office extension corresponding to a respective teleworking user to the fictitious port, calls to each assigned said office extension being directed to a respective connected said corresponding telephony device.

16. The system of claim 15 wherein received said instructions are in the form of DTMF tones.

17. The system of claim 16 wherein said DTMF tones are received by the switch and the digits represented thereby are sent to the telework server.

18. The system of claim 15 wherein at least one said corresponding telephony device is an ISDN device.

19. The system of claim 15 wherein at least one said corresponding telephony device is a digital proprietary interface.

20. The system of claim 15, wherein the switching network is a PBX.

21. The system of claim 15, wherein said telework server automatically assigns said office extension to the fictitious port and when a "find me" option is selected, the telework server simultaneously directs incoming said calls to a plurality of fictitious ports.

22. A method to allow each of a plurality of teleworking users via a corresponding telephony device to implement selected telephony features of a private branch exchange (PBX) through a public network, the method comprising the steps of:
selectively interconnecting each corresponding telephony device with a switching network including a plurality of standard physical ports, said switching network being capable of implementing system and station telephony features and handling call communications channel switching;
directly connecting the switching network to said each corresponding telephony device via a switching network interface which includes at least one fictitious port temporarily assignable to said each corresponding telephony device, each said telephony device assigned to a corresponding fictitious port being treated by said switching network as connected to a standard physical port; and
providing selected telephony features to said each corresponding telephony device via a telework server in communication with said switching network which receives instructions from said each corresponding telephony device after call connection to implement at least one telephony feature selected from a set of telephony features available at said switching network through said each corresponding telephony device, instructs said switching network to implement said selected telephony features and assigns the office extension corresponding to a respective teleworking user to the fictitious port, calls to each assigned office extension being directed to the connected said each corresponding telephony device.

23. The system of claim 22, wherein the switching network is a PBX and said telework server automatically assigns said office extension to the fictitious port.

24. A system for teleworking in association with a PBX system and allowing each of a plurality of teleworking users to access features of a PBX switch associated with the PBX system, through a public network, comprising:
a PBX interface that connects public network devices associated with teleworking users to the PBX switch of the PBX system via a fictitious port temporarily assigned to each public network device to directly connect the public network device to the PBX, each said public network device assigned to a corresponding fictitious port being assigned the office extension corresponding to a respective teleworking user and treated by said switching network as connected to a standard physical port at said assigned office extension; and
a telework server associated with said PBX system that controls the PBX switch to implement any feature of the available PBX switch features selected from connected said public network devices after call connection.

25. A teleworking method for connecting each of a plurality of devices each associated with a teleworker, said method comprising the steps of:
- connecting a device identified to a teleworker through a public network to a PBX switch of a PBX system having a telework server and a plurality of standard PBX ports, at least one standard PBX port being associated with the identified said teleworker;
- assigning one of a plurality of fictitious ports to said device, thereby directly connecting said device to the PBX;
- treating said device as being connected to a standard PBX port, said fictitious port being assigned based on matching a pre-determined class of service for said fictitious port and said device;
- said telework server assigning an office extension associated with the identified said teleworker to said fictitious port, calls to said at least one standard PBX port being directed to said device;
- selectively initiating access of available PBX switch features through said telework server after call connection; and
- said telework server instructing said PBX switch to implement selected features to allow PBX system feature access to said identified teleworker through said device.

26. The method of claim 25, wherein said telework server automatically assigns said office extension to the fictitious port and when a "find me" option is selected, incoming said calls are simultaneously directed to a plurality of fictitious ports.

* * * * *